Dec. 1, 1936.  F. LOUISOT  2,063,004
ART OF OBTAINING STEREOSCOPIC EFFECTS
Original Filed Dec. 20, 1933    2 Sheets-Sheet 1
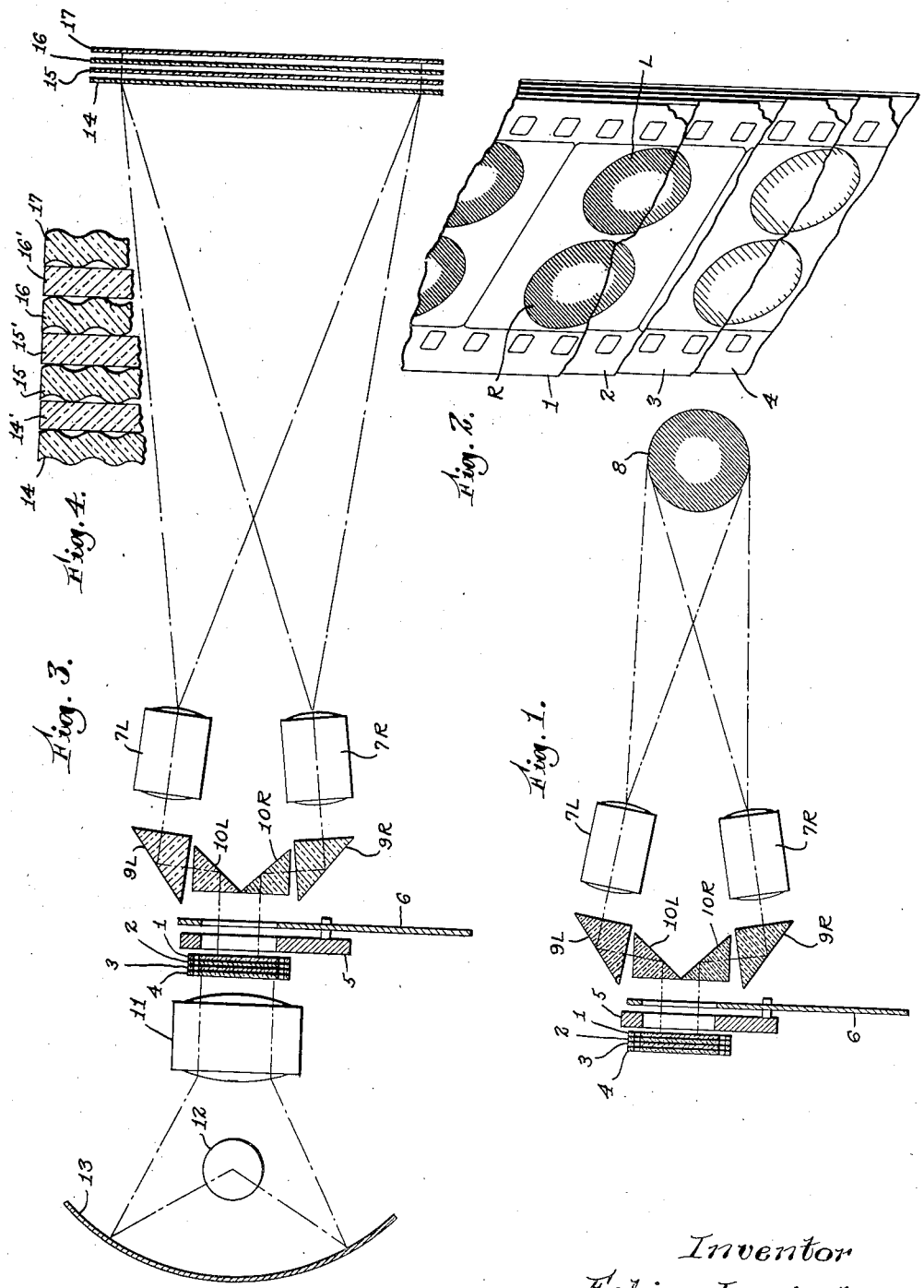
Inventor
Felix Louisot
by [signature]
Attorney Dec. 1, 1936.　　　　F. LOUISOT　　　　2,063,004
ART OF OBTAINING STEREOSCOPIC EFFECTS
Original Filed Dec. 20, 1933　　2 Sheets-Sheet 2

Inventor
Felix Louisot
by Geo. B. Rawlings,
Attorney

Patented Dec. 1, 1936

2,063,004

UNITED STATES PATENT OFFICE 2,063,004

ART OF OBTAINING STEREOSCOPIC EFFECTS

Felix Louisot, Hasbrouck Heights, N. J., assignor to William M. Sheffield, New York, N. Y.

Application December 20, 1933, Serial No. 703,258
Renewed August 26, 1936

2 Claims. (Cl. 88—24)

This invention relates to the art of taking and/or projecting stereoscopic pictures, either still or motion, and has for its general object to produce an effect of depth or distance or width or third dimension so that the images appear more life-like and realistic.

For best results I use a special camera, a special film or plate, and a special screen, each of which is in itself particularly designed to produce a steroscopic effect.

In the case of motion pictures, the stereoscopic camera is of course a camera adapted for taking motion pictures, and the motion pictures taken with such special camera are preferably projected by means of a special projector.

The camera, film or plate, projector, and screen, however, may be used independently of each other. For example, I may use standard film in my special camera, or I may use a standard screen with my special projector. Best results, however, are attained when the several special units are used together.

My special stereoscopic camera may be a camera adapted for taking either still or motion pictures, and adapted for use either with standard film or with my special film or plate. In either case, such camera is equipped with dual lenses and prisms so coordinated with each other as to produce a larger area of registration of the object photographed than is possible with a single lens camera of ordinary type and hence I am able to obtain an effect of great depth or relief in the picture.

My special steroscopic motion picture projector employs the same arrangement of dual lenses and prisms used in the stereoscopic camera.

My special stereoscopic film or plate is a laminated film or plate, consisting of a multiplicity of coated strips or plates placed one in front of the other. When this multi-layer film or plate is exposed, the object photographed is registered on each individual lamination thereof, as a plurality of superposed right and left hand images disposed side by side on the several laminations. After the film or plate is developed these show as a complete picture of great depth or relief.

Varying degrees of image registration may be had by varying the intensity or thickness of the sensitive coatings on the respective laminae.

My special steroscopic screen is also a laminated screen, consisting of a multiplicity of treated transparent panels or plates, placed one in front of the other.

With the laminated screen, the shape, treatment and/or spacement of the laminae is such that each successive plate or lamina receives a faint registration on the face thereof. The observer does not notice the registration on the front laminae because of its faintness, but looking into the entire series of built-up panels or laminae sees only an image which blends into a single, deep, solid, third dimension stereoscopic picture. $n viewing such picture, moreover, it is not necessary to use the colored filters, mats, or other aids now furnished the observer or built into the ordinary projection machine for obtaining stereoscopic effects.

As illustrative of the principles of my invention, I show in the accompanying drawings embodiments thereof which I have found highly satisfactory in service.

Fig. 1 is a diagrammatic plan section of a stereoscopic camera in accordance with my invention.

Fig. 2 is a fragmentary perspective of the special stereoscopic laminated film or plate which I prefer to use therewith.

Fig. 3 is a diagrammatic plan section of a stereoscopic motion picture projection machine in accordance with my invention and also showing the special steroscopic laminated screen which I prefer to use therewith.

Fig. 4 is an enlarged fragmentary section through my stereoscopic laminated screen showing an arrangement wherein the individual laminae are spaced apart by translucent or transparent spacers.

Figure 5:
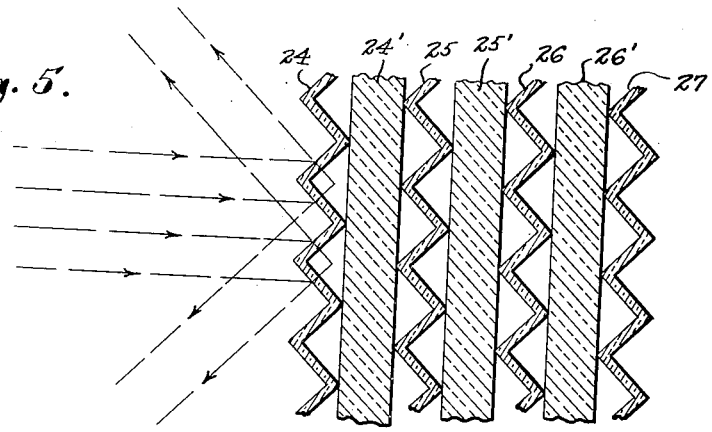
Figs. 5, 6 and 7 show modified arrangemets of laminae and spacers.

Referring first to Fig. 1, the stereoscopic camera, if a motion picture camera, may make use of the same intermittent movements as are now employed in standard motion picture cameras.

Such camera, whether used for taking still or motion pictures, is preferably so designed, however, as to operate with my special stereoscopic laminated film or plate. When used with such special film or plate, additional space is provided in the camera to accommodate the extra thickness of the laminated film or plate. My laminated film or plate, however, is of standard width so that no changes in respect to this phase of the camera structure are necessary.

Where desired of course standard single film or plate may be used in my camera instead of my special stereoscopic laminated film or plate. For the purposes of this application, however, I have shown my stereoscopic camera as equipped with my special laminated stereoscopic film or plate.

Such multi-layer film or strip may have any practicable number of laminae. As here shown there are four laminae. These are designated at 1, 2, 3 and 4 in Fig. 1 (and also Fig. 2). Said laminae are arranged one in front of the other. They occupy the same general position as the ordinary film or plate relative to the aperture opening of the usual aperture plate 5 and revolving shutter 6 of the camera.

I have indicated at 7R and 7L the dual lenses employed in my stereoscopic camera. These are arranged in proper focal relation to the object 8.

I have also indicated at 9R, 9L and 10R and 10L the dual prism system used in my special camera.

In using such camera, the image of the object 8 is focused through the right and left hand lenses and prisms, and registering apertures of plate 5 and shutter 6 onto the successive laminae of the laminated film or plate.

This results in an exposure having a larger area of object registration than is possible with a single lens camera, since the right hand lens and prism system 7R, 9R and 10R photographs more of the right hand side of the object, and the left hand lens and prism system 7L, 9L and 10L likewise photographs more of the left hand side of the object than would a single lens system.

The combined effect of the dual lens and prism arrangement is therefore to photograph not only the front but also a larger percentage of both the right and left sides of the object, as compared with only the front and none or little of the sides photographed when a single lens camera is used.

Thus it results with my stereoscopic camera that the photographed object, when projected, blends into one picture which has both right and left hand side registration as well as front registration. This gives the effect of great depth or relief in the projected picture.

The right side of the image 8 is focused through lens 7R and the image striking prism 9R is reflected to prism 10R where it is again reflected by prism 10R through registering shutter and aperture plate openings onto the right hand half of the registering surface of the multi-layer film or plate. This half of the image is indicated at R in Fig. 2.

Similarly, the left side of the image 8 is focused through lens 7L onto prism 9L, thence to prism 10L, and through the shutter and aperture plate onto the left hand half of the registering surface of the laminated film or plate. This half of the image is indicated at L in Fig. 2.

Both the right and left hand halves of the image are thus registered side by side on the film or plate on either side of an imaginary median line running longitudinally thereof.

It will be understood of course that when the shutter is opened to expose the film or plate, both images R and L are simultaneously photographed on such film or plate. Where the camera is equipped for taking motion pictures, and the feed of the film is timed to the revolution of the shutter, the shutter is thereafter closed while the next succeeding unexposed area or "frame" of the laminated film is brought into position for exposure when the shutter again opens, and so on, the several laminae being fed as a unit.

The images R and L are simultaneously photographed through all of the laminae of the exposed area of the film or plate. This results in an effect of depth of picture when the developed film is projected.

The several laminae are themselves of any usual transparent material now commonly used, as celluloid in the case of the film, or glass in the case of the plate, and are coated with the usual light-sensitive emulsions used in the art.

The sensitized coatings of the several laminae may vary in thickness or intensity, however, throughout the several laminations in order to obtain varying degrees of image registration on the film or plate. This is diagrammatically illustrated in Fig. 2 wherein the lamina 1 is shown as having a very thin coating of light-sensitive material, and the succeeding laminae 2, 3 and 4 as having progressively heavier coatings. From this it results that the intensity of the successive images R and L progressively decrease from front to rear, as likewise diagrammatically indicated in Fig. 2, the images on lamina 1 being heaviest and those on succeeding laminae progressively decreasing in intensity.

The several laminae may be variously spaced apart and may be flat, convex or other shape. They may also be roughened and/or colored in part or in whole to vary their transparency or give other unusual effects.

The laminated film or plate is fed, exposed and developed the same as the ordinary single strip. They are cemented or fastened together after developing with the images which have been registered thereon matched together to form a composite whole.

To produce positives, the multiple strips 1, 2, 3 and 4 are laid one on the other as they are taken from the camera. The multiple strip negative is laid on the positive strips and printed in the usual manner.

When used as a motion picture projector, the same dual lens and prism arrangement is used as in the camera. This is shown in Fig. 3, the parts appearing in said figure that also appear in Fig. 1 being designated by the same reference characters used in Fig. 1.

In addition Fig. 3 shows the usual condensing lens 11, light source 12 and reflector 13 employed in any standard projector. These are arranged in their usual relation to the film, picture aperture, and shutter.

The light beams emerging from the picture aperture, however, are intercepted by the dual prism and lens system 10L, 9L and 7L, and 10R, 9R and 7R so that the right and left images are projected simultaneously on the screen as one blended image. (See Fig. 3).

My special stereoscopic screen is a laminated screen consisting of a plurality of transparent laminae, here shown as four, arranged one in front of the other, as indicated at 14, 15, 16, and 17 in Fig. 3.

As many laminae may be used as needed and these may be of any desired material, shape, or effect. In practice I use a sufficient number of laminae to block or stop all light rays, or until full registration is obtained.

The several laminae are so shaped, treated or spaced that each lamination will receive a very faint registration of each image R and L. These combine as a single blended image when the screen is viewed, the individual registrations on the successive laminations being unnoticeable to the eye of the observer.

The first lamina 14 checks or retards somewhat the light rays passing through it. These rays continue on, being progressively retarded by the succeeding laminae 15, 16 and 17. As the rays pass through each successive lamina, they lose some of their brilliance or penetrating power, depending upon the degree of transparency of the laminae themselves. Thus some registration of the images carried by said light rays is left on each lamination, so that if the several laminations are properly spaced, these will blend into one image of great depth, thickness, or third dimension.

By increasing the distance between the individual laminae the light rays may be caused to spread, thereby causing different sizes of image to register upon different laminations. For example, if the distance between laminations 14 and 15 be increased a larger image will register on 15 than on 14 and a still larger image will register on 16 than on 15, etc. This spreading of the light rays therefore gives an effect of controlled magnification. The same result can be accomplished by using laminae which have different degrees of convexity. Or transparent spacers of varying thickness and shape may be interposed between the several laminae, and such spacers where used also have the effect of causing the laminae to retain their shape and relative positioning.

This is particularly important where the material of the laminae is some thin, flexible material as Cellophane.

As indicative of the many possible materials which may be used, I mention in addition to Cellophane, glass, celluloid, acetate, mica or other transparent mineral or vegetable matter.

Where desirable, the laminae or some of them may be specially shaped or specially treated to give unusual effects. For example they may be roughened in whole or in part as by sandblast, etching or the like, to give a pitted effect. Or they may be colored in whole or in part, as by means of dyes and pigments, or powdered substances such as talc, glass, aluminum, bronze, etc. may be dusted or sprayed on them.

Similarly, they may be given any desired shape, as by rolling or pressing to sheet, panel, rod, or disc form.

Thus, the laminae or their separators, if separators are used, may have any desired degree of transparency. They may be fully-transparent, semi-transparent, or merely translucent, either in whole or in part or to varying depths.

In Fig. 4, I have shown spacers or separators for the individual laminae. These spacers are designated respectively at 14', 15' and 16'. Preferably although not necessarily, the spacers are of the same material as laminae which they space apart. For example, if the laminae 14, 15, 16 and 17 are of Cellophane, the spacers 14', 15' and 16' are likewise of Cellophane. In a preferred arrangement, the laminae 14, 15, etc. are of creped or crinkled Cellophane, sometimes described as "silk-finish", and the spacers 14', 15', etc. are of clear Cellophane. The "silk-finish" Cellophane laminae 14, 15, etc. give the effect of registration and the clear Cellophane spacers 14', 15' etc. prevent undue spreading of the image in passing through the assembly of laminae and spacers.

Full registration is possible, because although the light rays are progressively absorbed by successive laminae they are not absolutely blocked by warp and weft threads, as in the case of a woven fabric screen.

Figure 6:
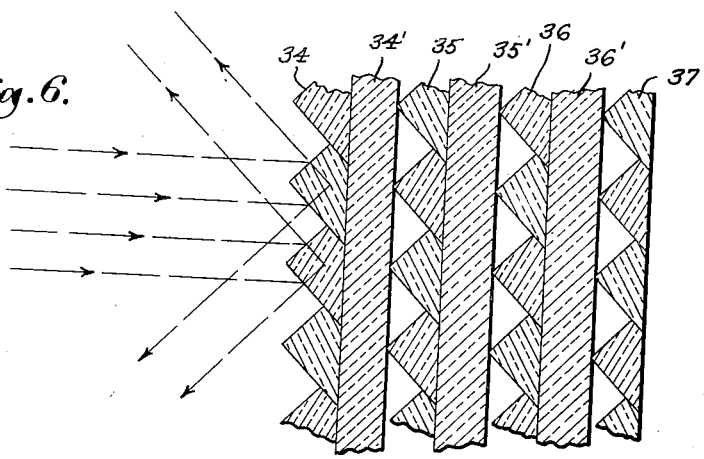
Figure 7:
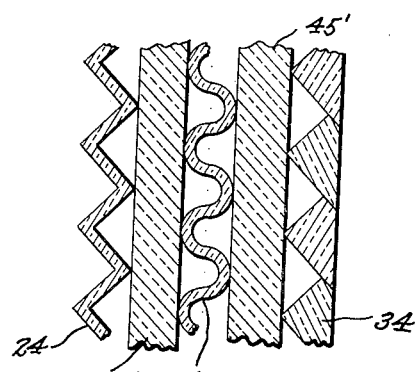

Figs. 5, 6 and 7 illustrate a few of the many possible arrangements of laminae and spacers. These figures also indicate diagrammatically the variations in effect resulting from the use of the several different arrangements.

In Fig. 5 the laminae 24, 25, 26 and 27 are shown as corrugated. These are or may be spaced by plane spacers 24', 25' and 26'. As many laminae and spacers may be used as desired. The corrugated form of lamina has the effect of deflecting the light rays towards the center of the screen. Being corrugated along right angled lines, the laminae present flat faces. These extend towards the rear of the screen at an angle to the observer and act as reflectors, as indicated diagrammatically by the arrows in Fig. 5, so that wherever the observer is seated in the theatre, he sees a deep as well as a clear, bright picture.

In Fig. 6 I show a variant in which each formed sheet or lamina 34, 35, 36 and 37 is made up of a plurality of refractive elements set edgewise. These are or may be spaced by plane spacers 34', 35' and 36'. As many laminae and spacers may be used as desired.

Optically, the action of the edgewise placed laminae is the same as the corrugated form of lamina 24 shown in Fig. 5.

In Fig. 7 I have shown a further variant. This figure combines the corrugated form of lamina 24 with the edgewise placed form 34. It also introduces a corrugated form 44 wherein the corrugation is wavy rather than angular, as in the case of the form 24.

These several forms 24, 34, 44 may be arranged in any desired order from front to rear but are preferably arranged in the order shown in Fig. 7. They are or may be spaced apart by plane spacers 44', 45', and as many laminae and spacers may be used as desired.

Although the foregoing arrangements sufficiently illustrate the many variations possible, various other arrangements will readily suggest themselves to those skilled in the art.

Thus, according to my invention, I am able to produce stereoscopic effects without the use of right and left hand colored filters, mats, etc. Instead the dual images are combined or blended on the screen in a replica of the single image which was actually photographed.

Various modifications in procedure and apparatus may obviously be resorted to within the spirit and scope of my invention as defined by the appended claims.

What I therefore claim and desire to secure by Letters Patent is:—

1. A built up stereoscopic projection screen, comprising a plurality of relatively thin laminae of transparent material disposed vertically on edge and in face to face parallel relation with each other, each lamina partially retarding the penetration of the projected light rays therethrough whereby from front to rear of the screen successively fainter registrations of the projected picture image are received on the several laminae and the several laminae together coacting to blend the several registrations as a single stereoscopic picture image when the screen is viewed from the front, there being spacers between the several laminae and said spacers being of the same material as the laminae.

2. A screen as claimed in claim 1 wherein the laminae are of silk finish Cellophane and the spacers are of clear Cellophane.

FELIX LOUISOT.